June 30, 1942.  D. O'DONOVAN  2,287,821
ORTHOPEDIC COMBINED WRIST JOINT AND DISTAL FOREARM SUPPORT
Filed April 10, 1940
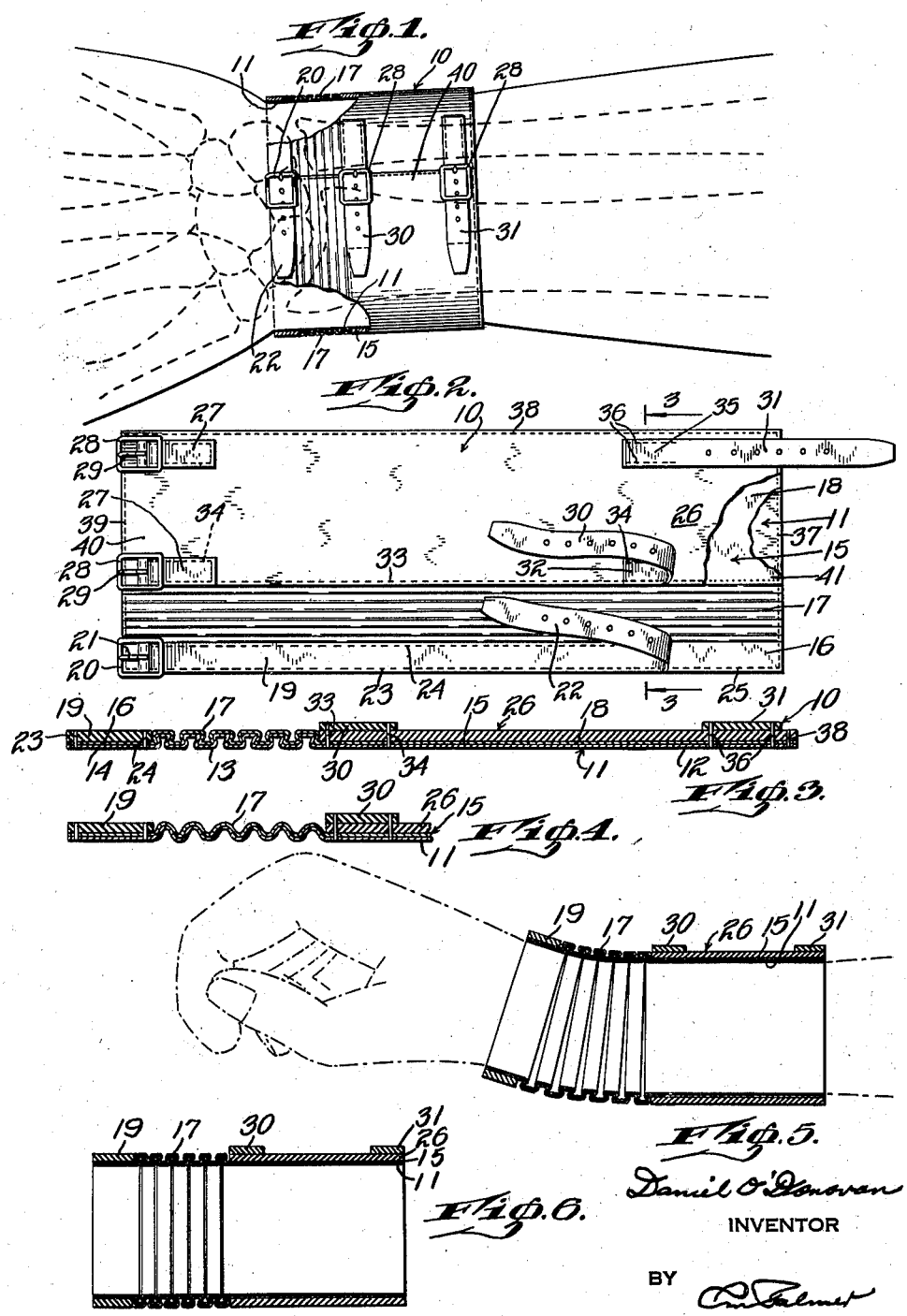
INVENTOR
Daniel O'Donovan
BY
ATTORNEY Patented June 30, 1942

2,287,821

UNITED STATES PATENT OFFICE 2,287,821

ORTHOPEDIC COMBINED WRIST JOINT AND DISTAL FOREARM SUPPORT

Daniel O'Donovan, New York, N. Y.

Application April 10, 1940, Serial No. 328,845

2 Claims. (Cl. 128—77)

The present invention is concerned with wrist joint supports and more particularly is concerned with a functionally and structurally orthopedic combined wrist joint and distal forearm support. It is well known that about the region of the wrist joint of a human arm a multiplicity of flexor and extensor tendons are held in place by the anterior and posterior annular ligaments of the wrist joint. When injury or disease has set in, the annular band of ligaments are weakened or partially destroyed and thus the tendons are inadequately retained and tend to shift outwardly. The object of the present invention is realized in the provision of a wrist band or support whereby the tendons are properly retained in place even though the annular band of ligaments about the wrist joint has been weakened or damaged. The invention has as a further object the provision of a wrist joint support having distal and proximal portions appropriately interconnected by a medial flexible gusset which is responsive and conforms to the natural movements of the skin and adjacent ligaments of the wrist joint, thus permitting comfortable easy normal movements of the wrist joint even though the annular ligaments have been weakened or damaged. The invention comprehends as a further important object to provide a wrist joint support or brace wherein the distal part thereof functions to support the first row of carpal bones of the hand, the structures of the wrist joint and the ligaments of the wrist joint, and the tendons passing over the wrist joint, wherein the intermediate or medial portion thereof is in the form of a bellows and supports the anterior and posterior annular ligaments, and the tendons passing under the ligaments thus allowing comfortable movement of the wrist joint, and wherein the proximal portion thereof supports the muscles and tendons of the distal part of the forearm and sustains the radius and ulna bones in the region of the distal part of the forearm. Other important objects, and functional and structural advantages, and features of the invention will appear from a consideration of the following detailed description considered in the light of the accompanying drawing wherein:

Fig. 1 is a prone view of the wrist joint support according to my invention, shown partly broken away and in section.

Fig. 2 is a plan view of the wrist joint support prior to attaching thereof to the forearm of the user and shown partly broken away and in section.

Fig. 3 is an enlarged sectional view on the line 3—3 of Fig. 2.

Fig. 4 is a fragmentary sectional view illustrating another embodiment.

Fig. 5 is a longitudinal side sectional view of the wrist joint support showing the action of the latter during extension of the wrist joint, and Fig. 6 is a longitudinal sectional view illustrating the wrist joint support or brace in its normal condition.

Illustrative of the several embodiments disclosed, the wrist joint support is generally designated 10 and comprises a relatively soft, flexible, and pliable rectangularly shaped chamois lining 11 embodying a proximal portion 12, a medial portion 13, and a distal portion 14.

Attached to the lining 11 and coextensive the width and length thereof is the flexible and pliable leather backing broadly denoted 15 having its distal portion 16 secured to the distal portion 14 of the lining, its medial or intermediate portion 17 appropriately secured to the medial portion of the lining while its proximal portion 18 is secured to the proximal portion 12 of the lining.

Superimposed on the distal portion 16 of the backing 15 is the strap 19 having fastened at one end thereof the buckle 20 with its swingable pin while the other perforated end 22 thereof is left free. More particularly lines of stitching 23 and 24 are utilized to fasten together the distal strap 19, backing 15 and the lining 11, while stitching 25 fastens together the backing and the lining to leave the perforated tail portion 22 free and swingable.

Associated with the proximal portion 18 of the backing 15 and secured thereto is the flexible and pliable reinforcing and relatively wide leather strip 26. Mounted at one end of strip 26 are the spaced straps 27 appropriately carrying the buckles 28 with their swingable pins 29.

Also secured to spaced portions of the reinforcing strip 26 but at the opposite end of the latter are the spaced straps 30 and 31. The inner end 32 of strap 30 is fastened to the strip 26 by the lines of stitching 33 and 34 which also secure together backing 15 and the lining 11. The inner end 35 of strap 31 is secured to the reinforcing strip 26 and the latter to the backing and lining by the spaced lines of stitching 36. And to more firmly secure the edges of the wrist joint support lines of stitching 37, 38 and 39 are employed as is well understood.

By the present arrangement, the medial part of the wrist joint support is in the form of a flexible, resilient and pliable gusset and as illustrated in Fig. 3, the gusset connection is in the form of a plurality of alternately arranged and spaced ribs having substantially flat heads and bases while in the embodiment according to Fig. 4 the flexible and resilient gusset also consist of a series of ribs in sinuous formation. In other words, in the form according to Figs. 3 and 4 the gusset in fact defines an accordion or flexible connection responsive to movements of the wrist joint, to wit, in any direction for extension of the joint, for flexing of the joint or for lateral extension thereof, of course in instances where the support is properly wrapped about the wrist joint as shown in Fig. 1 wherein the distal part thereof is over the first row of carpal bones, the proximal part thereof is over the distal part of the forearm, and the medially arranged gusset is about the intermediate part of the wrist joint.

With the wrist joint support positioned as above set out, the end marginal portion 40 is over and against the opposite end marginal portion 41 and hence the free ends of straps 22, 30 and 31 may be conveniently threaded through buckles 20 and 28 for properly tightening the support or brace 10 about the wrist joint in which instance of course the marginal ends 40 and 41 are in overlapped relation and hence movement of the joint causes the gusset to conform to the natural movement of the skin and the adjacent ligaments of the wrist joint. For example, in Fig. 5, the wrist joint may be said to be extended. In this instance the posterior or upper portion of the gusset or bellows is contracted while the anterior or lower part thereof is expanded. If the wrist joint be in a flexed relation the upper part of the gusset would be expanded and the lower part thereof contracted and as shown in Fig. 6 the ribbed parts of the gusset are shown in their normal relation.

Regardless of the movement of the wrist joint, the ligaments thereabout are adequately held in place to prevent spreading of the tendons by the compensatory gusset thus permitting easy and natural and yet comfortable movement of the wrist joint even in instances where the ligaments have been weakened or damaged. By the present invention a serious disadvantage in respect to prior art wrist supports has been overcome since the prior art wrist supports merely sustained the muscles and tendons of the distal part of the forearm and thus failed to effectively support the region about the wrist joint. It follows that the arrangement according to the invention provides effective means for adequately sustaining the wrist joint support whereby the tendons are properly retained in place even though the annular band of ligaments about the wrist have been weakened or damaged concomitantly permitting natural movements of the wrist joint in comfort by reason of the compensatory gusset connection between the distal and proximal portion of the wrist brace or support.

As many changes could be made in the above described constructions and many widely different or structural embodiments could be devised without departing from the scope thereof, it is intended that all matter hereinbefore described in the specification and illustrated in the accompanying drawing shall be interpreted as illustrative and not in a limiting sense.

I claim:

1. In a flexible wrist joint support, a flexible and pliable backing having a relatively narrow distal portion and a relatively wide proximal portion, an expandable and contractible gusset intervening and connected to said portions and having formed therein a plurality of substantially sinuous ribs disposed lengthwise of said support, a lining secured to said backing and having an intermediate portion provided with a plurality of substantially sinuous ribs fitting into and interlocking with said first mentioned ribs, a reinforcing and flexible strip secured to said proximal portion, complementary and disconnectible fastening means secured to said strip, and complementary fastening means secured to said distal portion.

2. In a flexible wrist joint support, a flexible and pliable backing having a relatively narrow distal portion and a relatively wide proximal portion, an expandable and contractible gusset intervening and connected to said portions and having formed therein a plurality of undulations disposed lengthwise of said support, a lining secured to and coextensive with the width and length of said backing and having an intermediate portion provided with a plurality of undulations fitting into and interlocking with said first mentioned undulations, a reinforcing and flexible strip secured to said proximal portion and substantially coextensive with the width and length thereof, complementary and disengageable strap means secured to the ends of said strip, and complementary fastening means secured to the ends of said distal portion.

DANIEL O'DONOVAN.